No. 749,880. PATENTED JAN. 19, 1904.
I. W. PULLMAN.
FLUID STRAINER.
APPLICATION FILED MAR. 26, 1901.
NO MODEL.
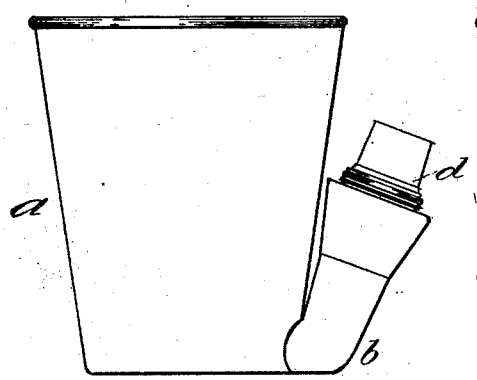
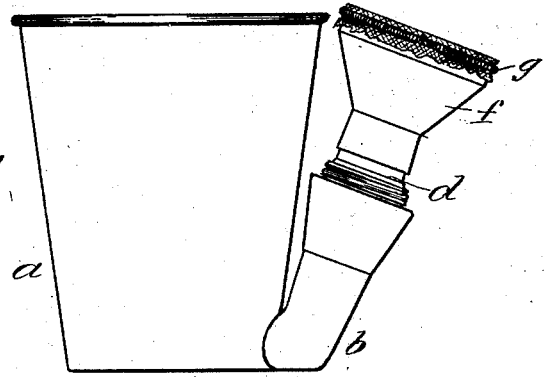
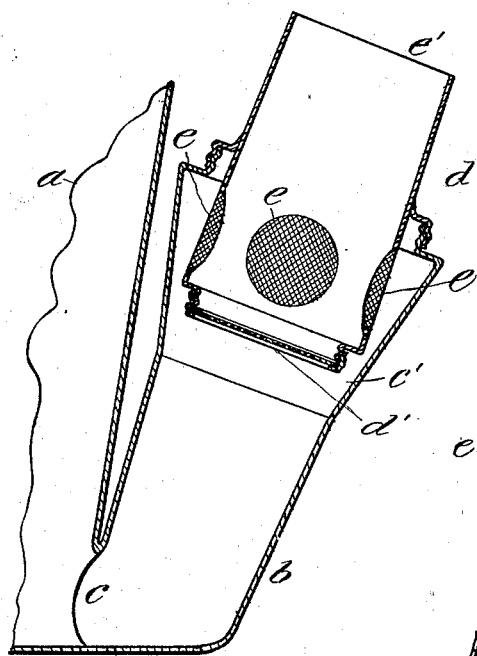
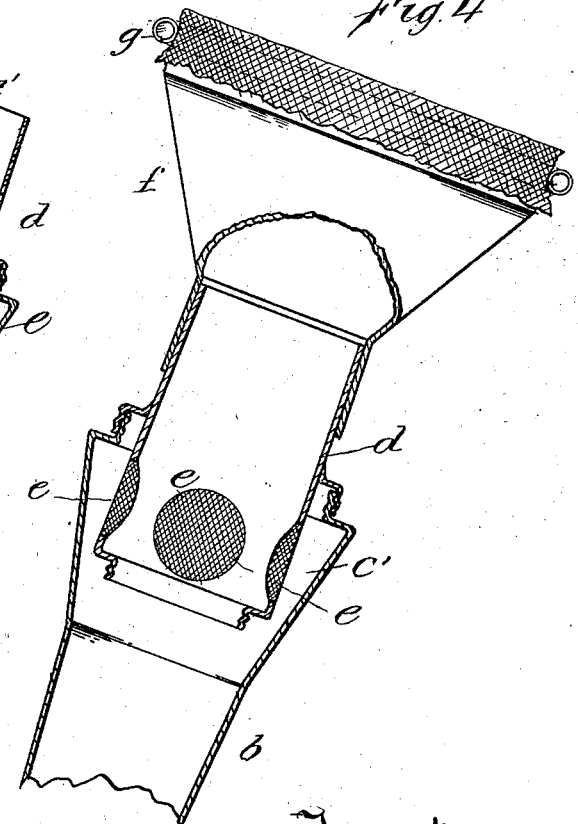
Witnesses:
Arthur B Jenkins
Erma P. Coffin
Inventor:
Irving W. Pullman
by Chas. L. Burdett
Attorney No. 749,880.

Patented January 19, 1904.

UNITED STATES PATENT OFFICE.

IRVING W. PULLMAN, OF BRISTOL, VERMONT.

FLUID-STRAINER.

SPECIFICATION forming part of Letters Patent No. 749,880, dated January 19, 1904.

Application filed March 26, 1901. Serial No. 52,910. (No model.)

*To all whom it may concern:*

Be it known that I, IRVING W. PULLMAN, a citizen of the United States, and a resident of Bristol, in the county of Addison and State of Vermont, have invented certain new and useful Improvements in Fluid-Strainers, of which the following is a full, clear, and exact description, whereby any one skilled in the art can make and use the same.

My invention relates more particularly to the class of dairy utensils, such as milk-pails and the like; and its object is to provide means for removing dirt and foreign material from milk in an effective and speedy manner.

The device is equally applicable to utensils for straining other fluids than milk, but finds its largest use in and about a dairy-farm.

Referring to the drawings forming part hereof, Figure 1 is a view in side elevation of a milk-pail provided with my improved strainer. Fig. 2 is a view in side elevation of a milk-pail with a supplemental strainer of cloth attached. Fig. 3 is a detail view, on enlarged scale, in central section, of the strainer. Fig. 4 is a detail view, on enlarged scale, in central section, of the strainer-cloth attachment.

In the accompanying drawings my improvement is illustrated as attached to and forming part of a milk-pail; but it is adapted for use as part of or an attachment to various forms of vessels and when so embodied comes within the intent and scope of my invention.

In the drawings the letter $a$ denotes the pail or other fluid-containing vessel, and $b$ the tubular inlet-section, located so that its lower end opens into the vessel at the side and at or very near the bottom by preference. The inlet-section $b$ is tubular in form and made in two or more sections, the inlet-section being secured at its lower end (as by means of solder) to the wall of a tin vessel, and at a short distance from the inlet $c$ this lower section flares to form a strainer-chamber $c'$. To this inlet-section $c$ the strainer-section $d$ is removably secured, as by means of interengaging threaded parts, and this section extends for about one-half its length within the strainer-chamber $c'$. On the inner end of this section $d$ is a cover $d'$, made up in greater part of wire-cloth of a fine mesh, and in the walls of this part of the strainer-section, within the chamber $c'$, strainers $e$ are located. This construction of the parts makes the greater part of the strainer-chamber $c'$ annular in form as to the part lying between the wall of the lower section and the surface of the strainer-section.

When the parts are arranged as illustrated in Figs. 1 and 3 of the drawings, milk which has been poured into the pail or drawn into the pail in milking is strained by tipping the vessel so that the milk will flow from the bottom thereof into the outlet-section or strainer-tube and the strainer-chamber, passing through the several strainers into the outlet $e'$. By drawing the milk from the bottom of the pail the froth and dirt which is collected at the top is left in the vessel and the cleaner part has been poured out, leaving the dirt and foreign matter within the strainer-chamber and the bottom of the pail. By the construction described a greater extent of strainer-surface is provided, and, furthermore, the pressure of the milk upward into the annular chamber when the pail is tipped increases the pressure upon the contents of the chamber and forces the milk through strainers in the walls of the strainer-tube, aiding in the operation.

In case it is desired to use a cloth strainer the strainer-tube is unscrewed, the cover $d'$ is removed, and the section again screwed in place. The bell-mouth section $f$ is then fitted upon the outer end of the strainer-section, and a cloth stretched across the mouth of the upper section is held in place by the spring-clamp $g$, which is a spiral spring bent into ring form and fastened, so as to provide an elastic and firm holding-grasp to retain the cloth and stretch it in position over the mouth of the strainer-tube. It will be noticed that this flaring mouth presents a very large surface, so as to allow the milk to be quickly strained through the cloth.

The several sections of the strainer-tube can be separated, so as to render all parts easily accessible for the purpose of thoroughly cleaning all parts of the strainer and the tube, which is a most essential feature in any utensil used about a dairy.

While the two sections of the strainer-tube have been described herein as separable, this being the desired construction, my invention is not limited to such construction so long as two sections of the tube are so connected as to form an annular strainer-chamber.

What I claim as my invention, and desire to secure by Letters Patent, is—

1. In combination in a sectional strainer, an inlet-section having an enlarged end, a tubular section located as to a part of its length within the inlet-section and forming with said inlet-section an annular strainer-chamber, and strainers arranged in the side walls and the end wall of the part projecting within the inlet-section.

2. In combination in a vessel, a strainer-tube secured at an opening into the lower part of the vessel and made up of two or more partible sections comprising an inlet-section and a strainer-section secured to and projecting within the inlet-section whereby an annular chamber is formed about the strainer-section, and strainers located in the side and end walls of the strainer-section.

IRVING W. PULLMAN.

Witnesses:
ROSSA E. JENNINGS,
WILLIAM W. RIDER.